Jan. 31, 1950     W. E. PORTER     2,495,906
HAND CARRIED SEED AND FERTILIZER SPREADER
Filed Sept. 7, 1948

INVENTOR.
WILLIAM E. PORTER
BY
McMorrow, Berman & Davidson
ATTORNEYS

Patented Jan. 31, 1950

2,495,906

UNITED STATES PATENT OFFICE 2,495,906

HAND CARRIED SEED AND FERTILIZER SPREADER

William E. Porter, Tacoma, Wash.

Application September 7, 1948, Serial No. 48,133

3 Claims. (Cl. 275—11)

This invention relates to portable or hand-carried material spreaders or dispensers, and more particularly to an improved, hand-carried device for spreading or distributing over the ground materials such as powdered or granulated fertilizer, lime, and seed.

It is among the objects of the invention to provide an improved, portable, hand-operated distributor for applying powdered or granular materials, such as seed or fertilizer and lime, to the surface of the ground, which distributor may be easily carried by a suitable handle or bail and holds a quantity of material providing the maximum efficiency of operation consistent with ease of manual handling of the device, which is fully adjustable to compensate for variations in grain size of the material, is automatically operated by a swinging or shaking movement of the device while held in the hand of the user, is effective to provide a uniform distribution of the material even though the material may be damp or lumpy, and which is simple and durable in construction, economical to manufacture, and easy and convenient to use.

A somewhat more specific object resides in the provision of a hand-carried, manually-operated seed and fertilizer distributor having a length sufficient to effectively cover the entire width of one row of a row crop or the width of the space between two adjacent rows, which includes a movable agitator for feeding fertilizer material through suitable apertures in the bottom thereof, which agitator is automatically operated upon manual swinging or shaking of the device, and which also includes a movable, adjusting plate for varying the size of the apertures or openings through which the material is distributed.

Other objects and advantages will become apparent from a consideration of the following description and the appended claims in conjunction with the accompanying drawing, wherein:

Figure 1:
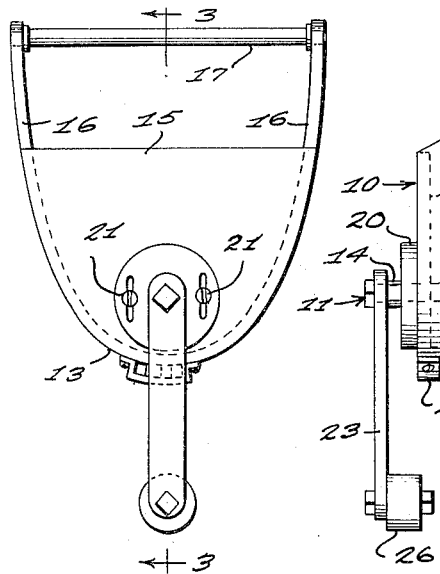
Figure 1 is an end elevation of a fertilizer distributor illustrative of the invention.
Figure 2:
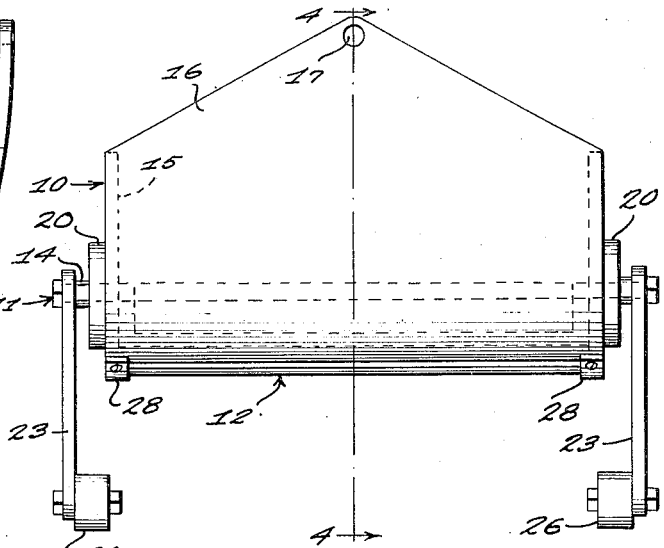
Figure 2 is a side elevation of a fertilizer distributor illustrated in Figure 1.
Figure 3:
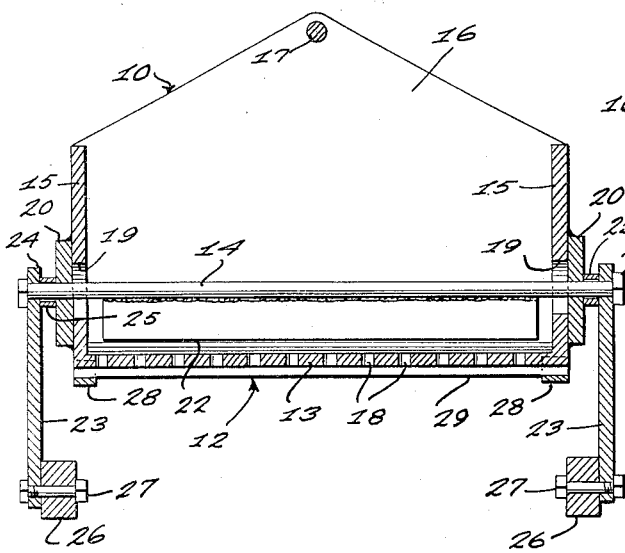
Figure 3 is a longitudinal cross-section taken substantially on the line 3—3 of Figure 1.
Figure 4:
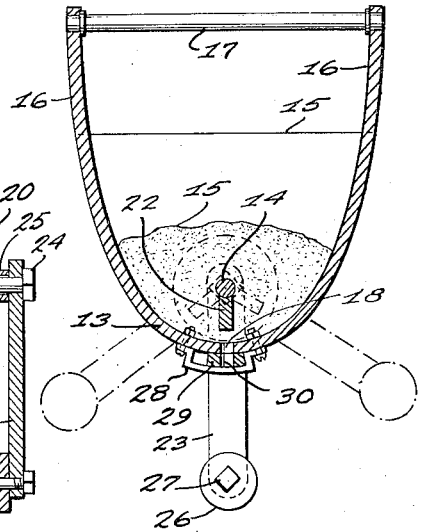
Figure 4 is a transverse cross-section taken substantially on the line 4—4 of Figure 2.

With continued reference to the drawing, the improved fertilizer distributor comprises, in general, a receptacle 10, an agitator mechanism 11 and an adjusting plate assembly 12.

The receptacle 10 comprises a piece of sheet material, such as suitable sheet metal, bent to provide a body of generally U-shaped cross-section including a partly-cylindrical bottom-wall portion 13 transversely curved on an arc centered on an axis with which the axis of the agitator shaft 14 is substantially coincident, and curved, diverging side-walls, the upper portions of which are substantially parallel to each other, and flat end-walls 15 secured one to each end of the sheet metal body which comprises the bottom-wall portion 13 and the side-wall portions 16.

A handle 17 extends between the upper-edge portions of the side-walls 16 at the mid-length location of the upper edges of the side-walls and is secured at its opposite ends to the side-walls to provide means by which the device may be easily carried by hand. The upper edges of the side-walls 16 are inclined downwardly away from the location of the handle 17 to the upper edges of the end-walls 15. The bottom-wall portion 13 of the receptacle is provided with a plurality of spaced-apart openings or apertures 18 through which material may pass from the interior of the receptacle 10. The distributing openings may be provided as a series of spaced-apart apertures substantially in alignment longitudinally of the bottom wall of the receptacle, as illustrated, or as a continuous slot extending lengthwise of the bottom wall of the receptacle, as may be desired.

Each end-wall 15 is provided with a respective elongated opening 19 located substantially midway of the width of the corresponding end-wall and spaced from the bottom-wall 13. The agitator shaft 14 extends through the apertures 19 and is journaled in bearing plates 20 adjustably secured one to the outer side of each end-wall 15 by suitable means, such as screws 21 extending through elongated slots in the bearing plates and threaded into the corresponding end-walls. By adjusting the bearing plates 20 the agitator shaft 14 may be moved toward or away from the bottom-wall portion 13 of the receptacle.

An agitator vane 22 is secured along one longitudinally-extending edge thereof to the shaft 14 and projects radially of the shaft toward the bottom-wall 13 of the receptacle. This vane has a length somewhat less than the distance between the two end-walls 15, and a width slightly less than the distance from the agitator shaft 14 to the bottom-wall 13, but may be brought substantially into contact with the inner surface of the bottom wall by suitable adjustment of the bearing plates 20. A pair of arms 23 is secured one to each end of the agitator shaft 14. In the arrangement illustrated, each arm 23 is provided near one end thereof with an aperture through which the shaft 14 extends, suitable means being provided to restrain the shaft against rotation relative to the arms, and nuts 24, threaded one upon each end of the shaft 14 secure the arms in operative position on the shaft.

Suitable spacing sleeves 25, preferably provided between the bearing plates 20 and the corresponding arms 23, hold the arms clear of the bearing plates and free of engagement with any portion of the receptacle 10. A respective weight 26 is secured to the outer end of each arm 23, that is, the end of the arm remote from the end attached to agitator shaft 14, by suitable means, such as the bolts 27 extending through bolt-receiving apertures provided in the weights and in the outer ends of the arms.

With this construction, when the receptacle 10 is swung or shaken from side-to-side the weights 26 will be caused to swing about the axis of shaft 14 thereby oscillating the shaft and the agitator vane 22 and causing material in the lower portion of the receptacle to flow through the dispensing openings 18. The rate at which the material flows through the openings 18 can be controlled by the rapidity of movement imparted to the shaft 14 and vane 22 in the manner above-described.

A pair of elongated, U-shaped clips 28 is secured to the outer surface of the bottom-wall portion 13 of the receptacle, one at each end of the receptacle, and an adjusting plate 29 overlies the outer surface of the bottom-wall of the receptacle adjacent the openings 18, and has its ends received in the clips 28. The plate 29 has a width less than the length of the clips 28 so that the plate is slidable relative to the bottom-wall of the receptacle, and this plate is provided with spaced-apart apertures 30 which are adjustably registrable with the apertures 18 in the bottom of the receptacle to vary the size of the distributing openings of the device. By adjusting the plate 29 the size of the openings may be varied to compensate for various grain sizes of the material distributed by the improved distributor.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hand-carried manually-operated distributor for materials such as seed and fertilizer, comprising an elongated receptacle having a partly-cylindrical bottom provided with material-distributing openings therethrough, substantially parallel side-walls and end-walls, a handle secured to said side-walls adjacent the mid-length position of the upper edges of the latter, a shaft journaled in said end-walls and extending through said receptacle adjacent said bottom-wall, an agitator vane secured along one longitudinally-extending edge to said shaft and projecting radially from the latter toward said bottom-wall, a pair of arms each secured at one end to the corresponding end of said shaft outside the adjacent end-wall of said receptacle, a respective weight on the end of each arm opposite the shaft-attached end of said arm to swing said vane back-and-forth across the distributing openings in the bottom-wall of said receptacle when said distributor in manually swung or shaken, a pair of clips secured to the outer side of said bottom-wall, one near each end of said receptacle, and an adjusting plate overlying the apertured portion of said bottom-wall and received at its ends in said clips, said adjusting plate having openings therein adjustably registrable with the openings in said bottom-wall.

2. A hand-carried, manually-operated distributor for materials such as seed and fertilizer, comprising an elongated receptacle having a partly-cylindrical bottom provided with material-distributing openings therethrough, substantially parallel side-walls and end-walls, a handle secured to said side-walls adjacent the mid-length position of the upper edges of the latter, a shaft journaled in said end-walls and extending through said receptacle adjacent said bottom-wall, an agitator vane secured along one longitudinally-extending edge to said shaft and projecting radially from the latter toward said bottom-wall, a pair of arms each secured at one end to the corresponding end of said shaft outside the adjacent end-wall of said receptacle, a respective weight on the end of each arm opposite the shaft-attached end of said arm to swing said vane back-and-forth across the distributing openings in the bottom-wall of said receptacle when said distributor is manually swung or shaken, a pair of clips secured to the outer side of said bottom-wall, one near each end of said receptacle, and an adjusting plate overlying the apertured portion of said bottom-wall and received at its ends in said clips, said adjusting plate having openings therein adjustably registrable with the openings in said bottom-wall, said bottom-wall being transversely curved on an arc centered on the axis of said agitator shaft.

3. A hand-carried, manually-operated distributor for material such as seed and fertilizer, comprising an elongated receptacle having a partly-cylindrical bottom provided with material-distributing openings therethrough, substantially parallel side-walls and end-walls, a handle secured to said side-walls adjacent the mid-length position of the upper edges of the latter, a shaft journaled in said end-walls and extending through said receptacle adjacent said bottom-wall, an agitator vane secured along one longitudinally-extending edge to said shaft and projecting radially from the latter toward said bottom-wall, a pair of arms each secured at one end to the corresponding end of said shaft outside the adjacent end-wall of said receptacle, a respective weight on the end of each arm opposite the shaft-attached end of said arm to swing said vane back-and-forth across the distributing openings in the bottom-wall of said receptacle when said distributor is manually swung or shaken, a pair of clips secured to the outer side of said bottom-wall, one near each end of said receptacle, and an adjusting plate overlying the apertured portion of said bottom-wall and received at its ends in said clips, said adjusting plate having openings therein adjustably registrable with the openings in said bottom-wall, the upper edges of said side-walls being downwardly inclined away from the location of said handle to the upper edges of said end-walls.

WILLIAM E. PORTER.

REFERENCES CITED

The following references are of record in the file of this patent:

UNITED STATES PATENTS

| Number | Name | Date |
|---|---|---|
| Re. 8,247 | Johnson | May 21, 1878 |
| 336,373 | Allen | Feb. 16, 1886 |

FOREIGN PATENTS

| Number | Country | Date |
|---|---|---|
| 499,220 | Great Britain | Jan. 20, 1939 |
| 509,990 | Germany | Oct. 15, 1930 |